United States Patent
Li et al.

(10) Patent No.: US 12,008,464 B2
(45) Date of Patent: Jun. 11, 2024

(54) NEURAL NETWORK BASED FACE DETECTION AND LANDMARK LOCALIZATION

(71) Applicant: ADOBE INC., San Jose, CA (US)

(72) Inventors: Haoxiang Li, San Jose, CA (US); Zhe Lin, Fremont, CA (US); Jonathan Brandt, Santa Cruz, CA (US); Xiaohui Shen, San Jose, CA (US)

(73) Assignee: ADOBE INC., San Jose, CA (US)

( * ) Notice: Subject to any disclaimer, the term of this patent is extended or adjusted under 35 U.S.C. 154(b) by 288 days.

(21) Appl. No.: 15/815,635

(22) Filed: Nov. 16, 2017

(65) Prior Publication Data

US 2019/0147224 A1    May 16, 2019

(51) Int. Cl.
| | |
|---|---|
| G06N 3/08 | (2023.01) |
| G06F 3/04812 | (2022.01) |
| G06F 18/2413 | (2023.01) |
| G06N 3/045 | (2023.01) |
| G06T 15/04 | (2011.01) |
| G06T 15/20 | (2011.01) |
| G06V 10/44 | (2022.01) |

(Continued)

(52) U.S. Cl.
CPC ........... *G06N 3/08* (2013.01); *G06F 3/04812* (2013.01); *G06F 18/24143* (2023.01); *G06N 3/045* (2023.01); *G06T 15/04* (2013.01); *G06T 15/205* (2013.01); *G06V 10/454* (2022.01); *G06V 10/764* (2022.01); *G06V 10/82* (2022.01); *G06V 40/165* (2022.01); *G06V 40/171* (2022.01)

(58) Field of Classification Search
CPC ........... G06K 9/00248; G06K 9/00281; G06K 9/4609; G06N 3/08; G06T 15/04; G06T 15/205; G06F 3/04812
See application file for complete search history.

(56) References Cited

U.S. PATENT DOCUMENTS

| | | | |
|---|---|---|---|
| 2015/0125049 A1* | 5/2015 | Taigman | G06T 3/18 382/118 |
| 2015/0347822 A1* | 12/2015 | Zhou | G06V 10/82 382/118 |

(Continued)

OTHER PUBLICATIONS

Zhang et al., "Joint Face Detection and Alignment Using Multitask Cascaded Convolutional Networks," Oct. 26, 2016, IEEE Signal Processing Letters, vol. 23, pp. 1499-1503. (Year: 2016).*

(Continued)

*Primary Examiner* — John W Lee
(74) *Attorney, Agent, or Firm* — Shook, Hardy & Bacon L.L.P.

(57) ABSTRACT

Approaches are described for determining facial landmarks in images. An input image is provided to at least one trained neural network that determines a face region (e.g., bounding box of a face) of the input image and initial facial landmark locations corresponding to the face region. The initial facial landmark locations are provided to a 3D face mapper that maps the initial facial landmark locations to a 3D face model. A set of facial landmark locations are determined from the 3D face model. The set of facial landmark locations are provided to a landmark location adjuster that adjusts positions of the set of facial landmark locations based on the input image. The input image is presented on a user device using the adjusted set of facial landmark locations.

18 Claims, 7 Drawing Sheets

(51) Int. Cl.
   *G06V 10/764*   (2022.01)
   *G06V 10/82*    (2022.01)
   *G06V 40/16*    (2022.01)

(56) References Cited

U.S. PATENT DOCUMENTS

| | | | | |
|---|---|---|---|---|
| 2016/0042223 | A1* | 2/2016 | Suh | G06V 40/161 |
| | | | | 382/118 |
| 2016/0275339 | A1* | 9/2016 | De la Torre | G06V 40/171 |
| 2017/0083751 | A1* | 3/2017 | Tuzel | G06V 40/171 |
| 2017/0147905 | A1* | 5/2017 | Huang | G06V 40/165 |

OTHER PUBLICATIONS

Hou et al., "Facial Landmark Detection via Cascade Multi-Channal Convolution Neural Network," Sep. 27-30, 2015, 2015 IEEE International Conference on Image Processing (ICIP), pp. 1800-1804. (Year: 2015).*

Xiao et al., "Facial Landmark Detection via Progressive Initialization, " Dec. 7-13, 2015, 2015 IEEE International Conference on Computer Vision Workshop (ICCVW), pp. 33-40. (Year: 2015).*

Kalinovskii, I.A, et al. Compact Convolutional Neural Network Cascade for Face Detection, 8 pgs. https://arxiv.org/abs/1508.01292.

Li, Haoxiang, et al., A Convolutional Neural Network Cascade for Face Detection, 10 pgs. http://ieeexplore.ieee.org/document/7299170/.

* cited by examiner

Example of Joint Calibration and Alignment Network(s)

Example of Landmark Location Mapper

NEURAL NETWORK BASED FACE DETECTION AND LANDMARK LOCALIZATION

BACKGROUND

Face detection generally attempts to determine a region of an image that contains a face, such as a bounding box of the face. Many image processing techniques rely on face detection, such as auto-focus, auto-exposure, red-eye removal, avatar-face mapping, face-blurring, face-manipulation, and more. Often, image processing techniques that rely on face detection use facial landmarks, which identify locations of particular facial features (e.g., mouth corners, eye corners, etc.) in an image. The quality of the output of an image processing technique can be closely tied to the accuracy of the face detection and facial landmarks. For example, a face processing tool might produce visual artifacts if facial landmarks it uses are not sufficiently accurate.

A conventional facial landmark detector generally identifies facial landmark locations within a bounding box in an image (e.g., a bounding box identified using face detection). In one approach, bounding boxes output by a face detector are used to train neural networks of a landmark detector. When implementing a landmark detector using neural networks, the model must often be large to achieve the accuracy required by many image processing techniques. This can cause the landmark detector to run slower, which can introduce a bottleneck into image processing techniques, such as those that determine facial landmarks in real-time (e.g., face-based avatar animation and real-time video effects) or otherwise operate on many images (e.g., batch processing). Further, a large model can cause the file size of applications containing the model to be large, which can be especially problematic for mobile applications where local storage is limited. Additionally, in the above approach, when either the face detector or the landmark detector is changed, significant processing power must be used to retrain the landmark detector in order to ensure accurate facial landmarks.

SUMMARY

Aspects of the present disclosure provide solutions for neural network-based face detection and landmark localization. In some respects, the disclosure provides a joint calibration and alignment network that is jointly trained to generate adjustments to a face region (e.g., bounding box) of an input image and identify initial facial landmark locations corresponding to the adjusted face region. By integrating these two correlated tasks into a neural network, the network can be made smaller and faster while still producing accurate face regions. In further respects, the initial facial landmark locations can be provided to a landmark location refiner to produce refined facial landmark locations that are more accurate than the initial facial landmarks. This allows the joint calibration and alignment network to remain small while still being used to produce highly accurate facial landmark locations. In further respects, the present disclosure provides a landmark location refiner that includes landmark location adjuster and a landmark location mapper that maps the initial facial landmark locations to an input of the landmark location adjuster, which may use more facial landmark locations than produced by the joint calibration and alignment network. This allows the joint calibration and alignment network to have fewer outputs to remain small and fast. Further, the landmark location adjuster can be modified without requiring retraining of the neural networks used to produce initial landmark locations. Thus, the disclosure provides significant flexibility to neural network-based face detection and landmark localization models.

BRIEF DESCRIPTION OF THE DRAWINGS

The present invention is described in detail below with reference to the attached drawing figures, wherein.

DETAILED DESCRIPTION

Figure 1:
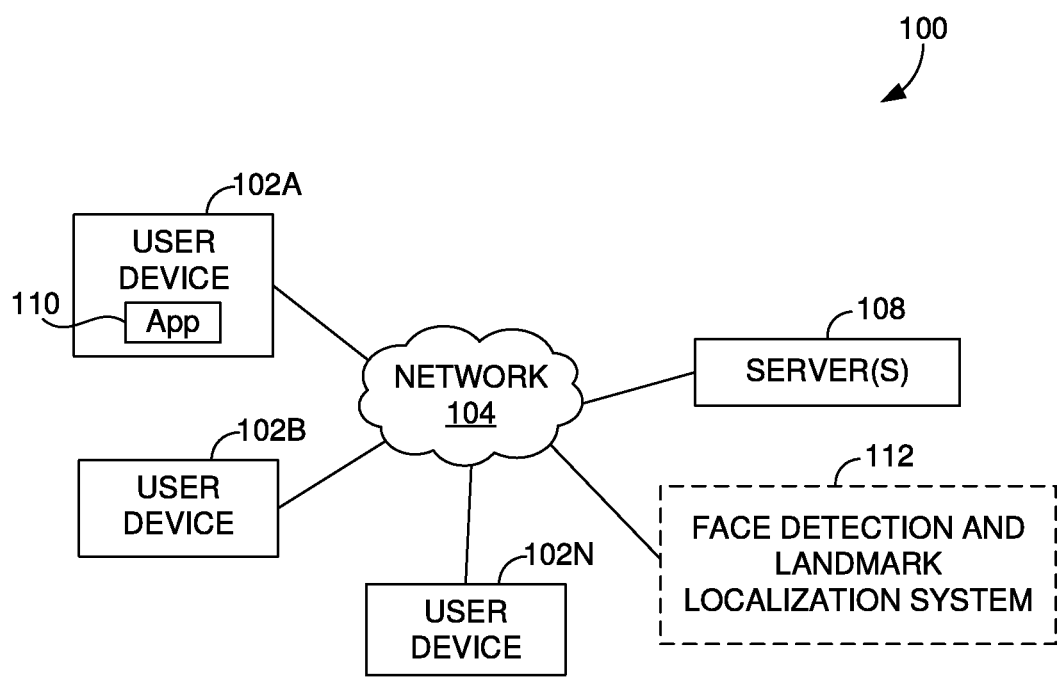
FIG. 1 is a block diagram showing an example of an operating environment, in accordance with embodiments of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

A conventional facial landmark detector uses a bounding box in an image identified using face detection as an input to identify facial landmark locations within the bounding box in the image. In one approach, bounding boxes output by a conventional face detector, which may be formed from cascaded neural networks, are used to train neural networks of a landmark detector. When implementing the landmark detector using neural networks, the model must often be large to achieve the accuracy required by many image processing techniques resulting in large file sizes and slow processing time. Further, when either the face detector or the landmark detector is changed, the landmark detector must be retrained. Approaches described herein allow for neural network-based face detection and landmark localization while mitigating these issues.

In some respects, the disclosure provides at least one neural network used to jointly determine a face region (e.g., bounding box) of an input image and identify initial facial landmark locations corresponding to the face region. As used herein a "face region" refers to data that defines a region of an image that is determined to contain a face. A face region can bound the face in the image, and could be a bounding box of the face, as an example. A face region includes spatial information such as size information that specifies the extent of the region and location information that specifies where the region is in the image.

By integrating these two correlated tasks using at least one neural network, the network(s) can be made smaller and faster while still producing accurate face regions. For example, learning facial features to determine a face region can be enhanced by accounting for landmark locations, allowing for a small and fast model that accurately determines face regions.

In some embodiments, the at least one neural network includes a joint calibration and alignment network, which receives an initial face region generated using a face detector (e.g., comprising at least one neural network) and generates adjustments to the initial face region in order to improve the accuracy of the face region. "Adjustments to a face region" refers to data that defines a modification to the spatial information that defines the face region and not to visual data such as the face in the image. For example, adjustments can be defined in terms of size and/or location in the image. The adjustments can be applied to the initial face region to produce an adjusted face region. The at least one neural network can be used to jointly determine the face region by jointly determining the adjustments and the initial facial landmark locations corresponding to the adjusted face region. For example, facial features of images may be captured using a fully-connected layer of a neural network that provides both the adjustment and landmark locations.

The adjusted face regions produced using the joint calibration and alignment network may be sufficiently accurate to use for image processing. However some image processing applications may require more accurate landmark locations. Rather than increasing the size and complexity of the neural network, in some embodiments the initial landmark locations are used by a landmark location refiner to produce refined facial landmark locations that are more accurate than the initial facial landmarks. This allows the joint calibration and alignment network to remain small while still being used to produce highly accurate facial landmark locations.

In further respects, the present disclosure provides a landmark location refiner that includes landmark location adjuster and a landmark location mapper that maps the initial facial landmark locations to an input of the landmark location adjuster. The landmark location adjuster may adjust positions of landmark locations provided as the inputs to make them more accurate. The inputs may be a different number of facial landmarks and/or different facial landmarks than what is produced by using the joint calibration and alignment network. The landmark location mapper can use the landmark locations from the joint calibration and alignment network to produce the inputs which are compatible with the landmark location adjuster. This allows the joint calibration and alignment network to have fewer outputs to remain small and fast. In addition or instead, the landmark location adjuster can be modified without requiring retraining of the neural networks used to produce initial landmark locations.

In some embodiments, the landmark location mapper includes a 3D face mapper which maps the initial landmark locations from the joint calibration and alignment network to a 3D model of a face. The 3D model can be used to determine landmark locations that conform with the input requirements of the landmark location adjuster. For example, the 3D face model can be projected into 2D using the pose of the face in the image to produce 2D coordinates as inputs to the landmark location adjuster. This approach allows any number of landmark locations to be extrapolated from the initial facial landmark locations.

Turning now to FIG. 1, a block diagram is provided showing an example of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, operating environment 100 includes a number of user devices, such as user devices 102A and 102B through 102N, network 104, and server(s) 108.

It should be understood that operating environment 100 shown in FIG. 1 is an example of one suitable operating environment. Each of the components shown in FIG. 1 may be implemented via any type of computing device, such as one or more of computing device 700 described in connection to FIG. 7, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other disclosed components may be employed within operating environment 100 within the scope of the present disclosure. Each may comprise a single device or multiple devices cooperating in a distributed environment.

User devices 102A through 102N comprise any type of computing device capable of being operated by a user. For example, in some implementations, user devices 102A through 102N are the type of computing device described in relation to FIG. 7 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may optionally implement one or more components of face detection and landmark localization system 112, described in additional detail below (e.g., at least some of model applicator subsystem 212B of FIG. 2B). The instructions may be embodied by one or more applications, such as application 110 shown in FIG. 1. Application 110 is referred to as a single application for simplicity, but its functionality can be embodied by one or more applications in practice. As indicated above, the other user devices can include one or more applications similar to application 110.

The application(s) 110 may generally be any application capable of facilitating the presentation of images based on facial landmark locations detected in those images or otherwise capable of carrying out aspects of the present disclosure, such as processing the images to determine the facial landmark locations and/or processing the images using the facial landmark locations. In some implementations, the application(s) comprises a web application, which can run in a web browser, and could be hosted at least partially on the server-side of operating environment 100. In addition, or instead, the application(s) can comprise a dedicated application, such as media editing software, examples of which include Adobe® Photoshop®, Adobe After Effects®, and Adobe Premiere®. In some cases, one or more applications represented by application 110 is integrated into the operating system (e.g., as a service). As an example, application 110 may be part of a camera application integrated into the operating system of a mobile device. As further examples, application 110 can be part of the firmware of a digital camera. It is therefore contemplated herein that "application" be interpreted broadly.

Server(s) 108 also includes one or more processors, and one or more computer-readable media. The computer-readable media includes computer-readable instructions executable by the one or more processors. The instructions may optionally implement one or more components of face detection and landmark localization system 112, described in additional detail below (e.g., at least some of model training subsystem 212A of FIG. 2B). However, the components of face detection and landmark localization system 112 (also referred to as "system 112" for brevity) may generally be implemented on any combination of server(s) 108, user devices 102A, and/or application(s) 110. Additionally, other components not shown may also be included within the distributed environment.

Thus, it should be appreciated that system 112 may be provided via multiple devices arranged in a distributed environment that collectively provide the functionality described herein, or may be embodied on a single device. In some cases, system 112 can be integrated, at least partially, into a user device, such as user device 102A. Furthermore, system 112 may at least partially be embodied as a cloud computing service.

For cloud-based implementations, the instructions on server 108 may implement one or more components of system 112, and application 110 may be utilized by a user to interface with the functionality implemented on server(s) 108. As mentioned above, in some cases, application 110 comprises a web browser, which may provide a user interface to services hosted on server 108. In other cases, server 108 may not be required. For example, the components of system 112 may be implemented completely on a user device, such as user device 102A. In this case, system 112 may be embodied at least partially by the instructions corresponding to application 110.

System 112 can train a face detection and landmark localization model to determine face regions of images and facial landmark locations in the face regions. Face detection and landmark localization system 112 can in addition or instead use the trained face detection and landmark localization model to determine face regions of images and facial landmark locations in the face regions. In various implementations, system 112 includes at least one neural network used to determine face regions (e.g., by determining adjustments to initial face regions) and identify initial facial landmark locations corresponding to the face regions. The initial facial landmark locations are provided to a landmark location refiner which produces refined facial landmark locations from the initial facial landmark locations. Using this approach, the at least one neural network can be small allowing for a small storage size and fast image processing. Further, the landmark location refiner can be modified without requiring retraining of the at least one neural network.

Figure 2A:
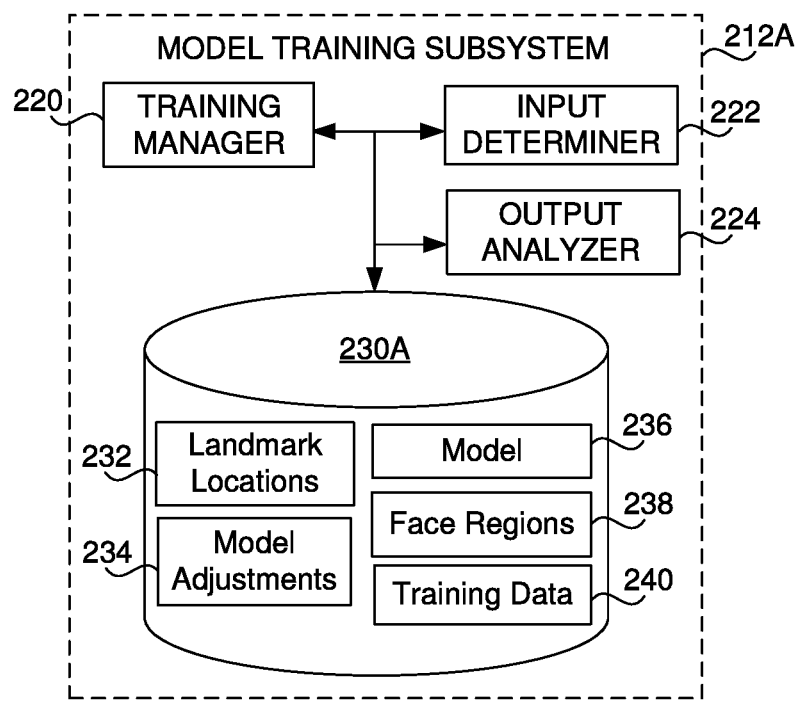
FIG. 2A shows a block diagram of a model training subsystem, in accordance with embodiments of the present disclosure.
Figure 2B:
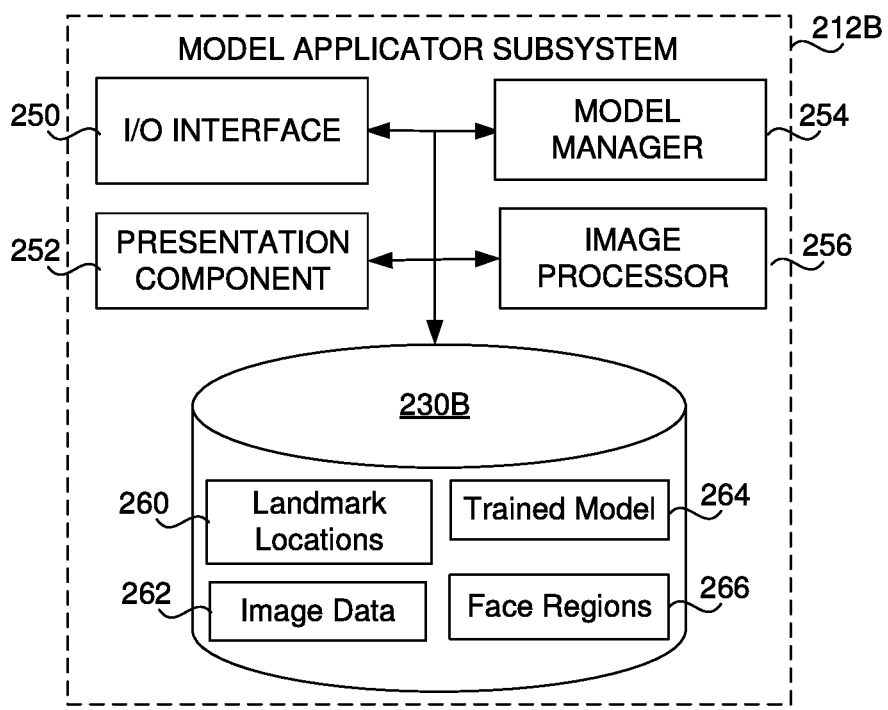
FIG. 2B shows a block diagram of a model applicator subsystem, in accordance with embodiments of the present disclosure.

Referring to FIGS. 2A and 2B, FIG. 2A shows a block diagram of model training subsystem 212A, in accordance with embodiments of the present disclosure, and FIG. 2B shows a block diagram of model applicator subsystem 212B, in accordance with embodiments of the present disclosure. One or both of block diagram of model training subsystem 212A and model applicator subsystem 212B may be included system 112 of FIG. 1.

In some embodiments, model training subsystem 212A is located on server(s) 108 and model applicator subsystem 212B is located on user device 102A. For example, model applicator subsystem 212B may be embodied in application 110. However, as indicated above, one or more components of model training subsystem 212A and/or model applicator subsystem 212B may be distributed across a user device and/or servers. For example, image processor 256 and/or model manager 254 could be on a server and presentation component 252 could be part of application 110 on user device 102A.

Further, as shown, model training subsystem 212A includes storage 230A and model applicator subsystem 212B includes storage 230B, which can be the same storage system or separate storage systems. For example, storage 230B could be located on user device 102A and storage 230A could be located on server(s) 108. Additionally, data is shown as being in a particular one of storage 230A and 230B as an example. However, that data may be located in either of storage 230A and 230B. For example, trained model 264 could be stored on user device 102A, or could be stored in the cloud (e.g., on server(s) 108).

Storage 230A and 230B can each comprise computer-readable media and are configured to store computer instructions (e.g., software program instructions, routines, or services), data, and/or models used in embodiments described herein. In some implementations, storage 230A and/or 230B stores information or data received via and/or generated by the various components of system 112 and provides the various components with access to that information or data, as needed. In implementations, storage 230A and/or 230B can each comprise a data store (or computer data storage). Each storage 230A and/or 230B may be embodied as one or more data stores and may be at least partially in the cloud. Some information, such as data objects, may be stored on a user device (e.g., user device 102A), and other information may be stored externally (e.g., on a server 108). Thus, it should be appreciated that the information may be distributed in any suitable manner across one or more data stores for storage (which may be hosted externally).

Among other potential information, storage 230A includes, as examples, landmark locations 232, model adjustments 234, model 236, face regions 238, and training data 240. Storage 230B includes, as examples, landmark locations 260, image data 262, trained model 264, and face regions 266.

As an overview, model training subsystem 212A is configured to train model 236 using training data 240. The training results in trained model 264, which is model 236 after being trained by model training subsystem 212A. Model training subsystem 212A includes training manager 220, input determiner 222, and output analyzer 224.

Training manager 220 is configured to manage the training of model 236. Input determiner 222 is configured to determine inputs to model 236 that are used to train model 236. The inputs can be determined from training data 240. Output analyzer 224 is configured to analyze outputs of model 236 to determine adjustments to model 236 for the training. Training manager 220 can manage the training of model 236 by providing model 236 with the inputs determined by input determiner 222, and adjusting model 236 using the adjustments determined by output analyzer 224.

In various implementations, training data 240 comprises a plurality of input images which input determiner 222 selects as the inputs for training model 236. For each input image, model 236 may produce at least one of landmark locations 232 and at least one of face regions 238 (e.g., when model 236 determines a face is present in the image). Output analyzer 224 uses the determined landmark locations 232 and face regions 238 to determine model adjustments 234 for model 236 based on ground truth data from training data 240 (e.g., using a loss function). The ground truth data may include expected face regions and/or landmark locations. Training manager 220 can apply model adjustments 234 to model 236 and continue training model 236 with additional input images. Example operation of model training subsystem 212A will later be described in additional detail. Training manager 220 may also optionally determine when training of model 236 is complete. For example, training manager 220 could monitor and/or analyze model adjustments 234 to determine model 236 is sufficiently trained.

As an overview, model applicator subsystem 212B is configured to apply trained model 264 to at least some of image data 262. As mentioned above, trained model 264 is model 236 after it has been trained by model training subsystem 212A. Model applicator subsystem 212B includes input/output (I/O) interface 250, presentation component 252, model manager 254, and image processor 256.

I/O interface 250 is configured to receive inputs from at least one user and/or applications, services, and/or systems. Model manager 254 is configured to apply image data 262 to trained model 264 to produce landmark locations 260 and face regions 266. Image processor 256 is configured to process image data 262 using landmark locations 260 and/or face regions 266. Presentation component 252 is configured to cause presentation of image data 262 based on landmark locations 260 and/or face regions 266 (e.g., using processed image data 262 from image processor 256). It is noted that various components of model applicator subsystem 212B need not be included. For example, image processor 256 and/or presentation component 252 may not be required.

As mentioned above, I/O interface 250 is configured to receive inputs from at least one user and/or applications, services, and/or systems. At least some of the inputs can cause model applicator subsystem 212B to apply trained model 264 to at least some of image data 262. The inputs can be received as at least one computer message or communication (e.g., API call), which may be received over network 104 (e.g., as network communications), or may be internally transmitted and received within user device 102A.

As an example, where I/O interface 250 is part of application 110, it may comprise or be associated with a user interface (e.g., a graphical user interface), which provides the inputs as user inputs. As an example, the user may select at least some of image data 262, which could comprise a user selection of one or more images, videos, and/or data objects containing that data (e.g., image files or video files). Model applicator subsystem 212B may then uses the selected image data as inputs to trained model 264. As another example, the user may select a capture option on user device 102A (e.g., a physical button) and/or in application 110, causing at least some of image data 262 to be captured and/or generated, and further causing the image data to be automatically used as inputs to trained model 264 (e.g., in real-time). However, it is noted that I/O interface 250 need not comprise and/or be associated with a user interface.

Model manager 254 is configured to apply image data 262 to trained model 264 to produce at least one of landmark locations 260 and at least one of face regions 266. As indicated above, model manager 254 may apply image data 262 to trained model 264 based on inputs from I/O interface 250. In some embodiments, model manager 254 is further configured to updated trained model 264 and/or portions thereof. For example, where model training subsystem 212A retrains or provides additional training to at least one portion of model 236, model manager 254 can update trained model 264 to reflect that version. As another example, model manager 254 can update at least one portion of trained model 264 that does not require training, such as non-neural network based sub-models and/or algorithms of trained model 264. Model manager 254 can receive the updates over I/O interface 250, in manners such as has been described above. This could, for example, be part of an update process for application 110, by way of example.

Image processor 256 is optionally included and is configured to process input images using at least one of landmark locations 260 and/or at least one of face regions 266 produced using trained model 264. For example, image processor 256 could modify an input image using any combination of this information. As a specific example, image processor 256 could apply a face-aware liquefy effect to the input image. A face-aware liquify effect can allow a user to selectively push, pull, rotate, reflect, pucker, and bloat any area of a face while accounting for facial features (e.g., to make the face look slimmer or to create a comical appearance). As another example, image processor 256 could generate an animation frame of an avatar from the image using any combination of this information (e.g., using the data to map the image to the avatar). As a further examples, image processor 256 could perform red-eye removal, auto-focus, auto-exposure, face-blurring or tiling (e.g., to automatically anonymize a person's face), face-manipulation, face region and/or facial landmark overlay on the image, and more using this information.

Presentation component 252 is configured to cause presentation of image data 262 based on landmark locations 260 and/or face regions 266. This can include I/O interface 250 transmitting one or more computer signals and/or communications that cause the presentation. For examples, the communications may include at least some of the data to be presented. The presentation can include display of image data 262, processed image data 262, and/or data generated based on or from image data 262. In some cases, the presenting is of at least some of image data 262 that has been processed by image processor 256. In some cases, the presenting is of at least some of image data 262 without being processed by image processor 256.

Figure 3:
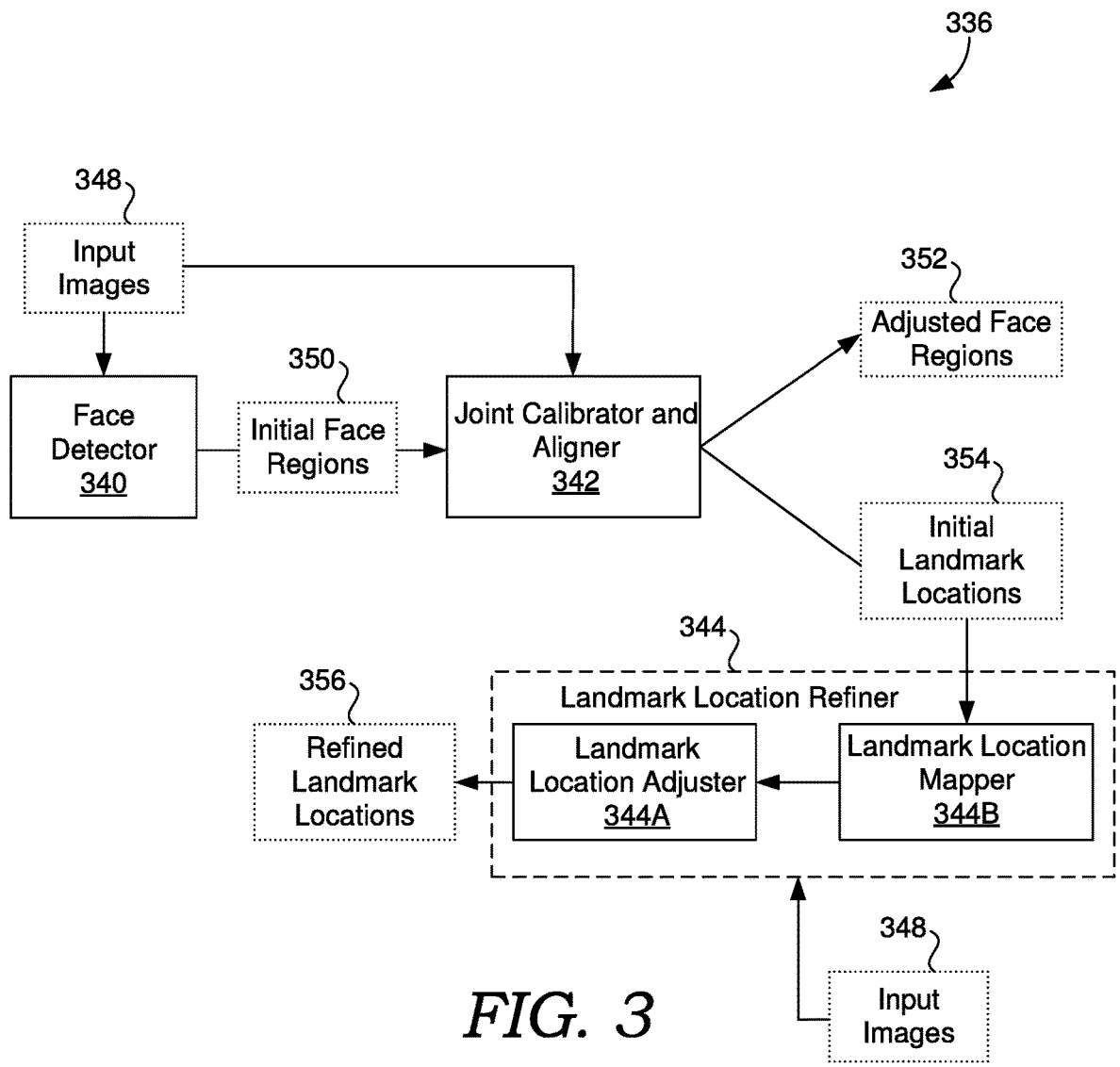
FIG. 3 shows a block diagram that includes a face detection and landmark localization model, in accordance with embodiments of the present disclosure.

FIG. 3 shows a block diagram that includes a face detection and landmark localization model, in accordance with embodiments of the present disclosure. In particular, FIG. 3 show model 336, which can correspond to model 236 in FIG. 2A and trained model 264 in FIG. 2B. For purposes of description it will be assumed that model 336 has already been trained. In the example shown, model 336 includes face detector 340, joint calibrator and aligner 342, and landmark location refiner 344.

Face detector 340 is configured to determine initial face regions 350 in input images 348. Joint calibrator and aligner 342 is configured to jointly determine adjustments to initial face regions 350, resulting in adjusted face regions 352, and determine initial landmark locations 354. Landmark location refiner 344 is configured to refine initial landmark locations 354, resulting in refined landmark locations 356.

Face detector 340 can take on various forms, which may include at least one face detection neural network. The face detection neural network can be, for example, a face region classifier neural network capable of classifying a candidate region of an input image as containing a face. For example, the face detection neural network can perform face vs. non-face binary classification to various candidate regions of an input image to filter out regions that do not contain a face, while retaining remaining candidate regions.

In using model 336, model manager 254 can, for example, scan the input image using, for example, a sliding window or other approach to produce a set of candidate regions with sufficient coverage of the input image so that faces are not overlooked. Multiple sized candidate regions can be used, such as to cover both cases where face regions in the input image are large (e.g., the entire input image) and small (e.g., one of many faces in an image).

A specific example of face detector 340 is provided herein, although there are many suitable approaches for face detection. In some embodiments, face detector 340 comprises a cascade of three face detection neural networks, each of which may be a convolutional neural network (CNN). Training these neural network can include, training the initial network, fixing the parameters of the trained initial network while using the trained initial network to train the subsequent network, and fixing the parameters of the trained initial and subsequent network while using those two networks to train the final network. It should be appreciated that any number of face detection neural networks could be employed.

By way of example, model manager 254 can use face detector 340 to scan an entire input image from input images 348 densely across different scales to quickly reject more than approximately 90% of detection windows, which may also be referred to as candidate regions or candidate boxes. For example, model manager 254 may build the input image into a sub-image pyramid to cover faces at different scales and each level in the image pyramid can be resized for the initial neural network. For an image size 800×600 using 4-pixel spacing, 2,494 candidate regions may be generated. The remaining candidate regions can be processed by face detector 340 one by one as N×N sub-images, where N can be, for example, twelve, to adjust the size and location of the candidate regions to approach bounding a potential nearby face. Non-maximum suppression (NMS) may be applied to eliminate highly overlapped candidate regions.

The remaining candidate regions can be cropped out from the input image and resized into a larger size than used for the initial neural network, such as 24×24, to provide as inputs to the subsequent neural network. The subsequent neural network can further reject approximately 90% the remaining candidate regions, which can similarly be adjusted in size and location to approach bounding a potential nearby face. Further, NMS may again be applied to eliminate highly overlapped candidate regions.

The remaining candidate regions can be cropped out from the input image and resized into a larger size than used for the initial neural network, such as 48×48, to provide as inputs to the final neural network, which can operate similar to the proceeding neural networks. Again, NMS can be used to remove overlapped detection windows with an Intersection-Over-Union (IoU) ratio exceeding a pre-set threshold. What remains of the candidate regions can be initial face regions 350.

Joint calibrator and aligner 342 can comprise at least one joint calibration and alignment neural network that generates adjustments that are applied to initial face regions 350 to result in adjusted face regions 352, and generates initial landmark locations 354 which correspond to adjusted face regions 352. Joint calibrator and aligner 342 can improve a face region (e.g., bounding box) quality by jointly predicting adjustments (e.g., using calibration patterns) for the face region and detecting the facial landmarks. Having two jointly trained tasks improves the ability of model 336 to accurately determine adjusted face regions 352, while keeping the model size small. For example, face regions 352 can be suitable to use as face regions 266 in FIG. 2. In particular, image data 262 may be presented using presentation component 252 and/or image processor 256 based on adjusted face regions 352.

Figure 4A:
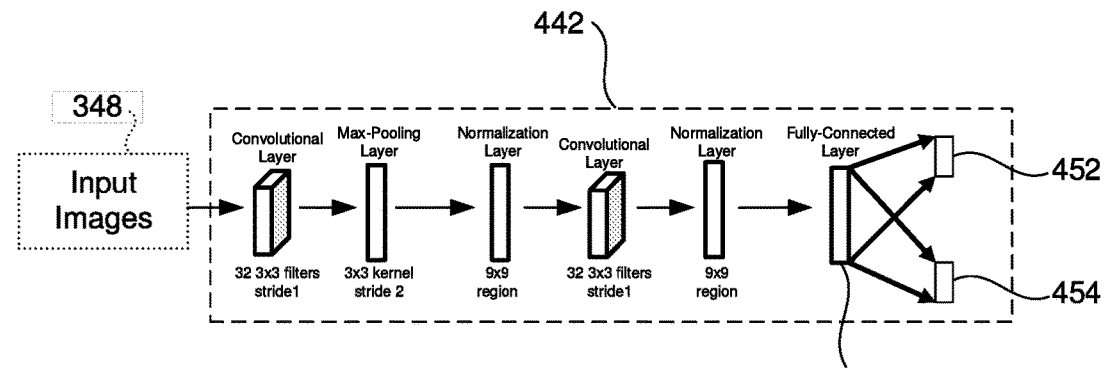
FIG. 4A shows a block diagram that includes a joint calibration and alignment neural network, in accordance with embodiments of the present disclosure.

FIG. 4A shows a block diagram that includes a joint calibration and alignment neural network, in accordance with embodiments of the present disclosure. Joint calibration and alignment neural network 442 is an example of the joint calibration and alignment neural network that can be included in joint calibrator and aligner 342.

As shown, joint calibration and alignment neural network 442 generates adjustments 452. In this example, joint calibration and alignment neural network 442 includes pre-defined calibration patterns, and adjustments 452 are a set of confidence scores that includes a confidence score for each calibration pattern. Model manager 254 can use the confidence scores to apply calibration patterns to face regions resulting in adjusted face regions 352. As an example, N calibration patterns can be pre-defined as a set of three-dimensional (3D) scale changes and offset vectors $\{[s_n,x_n,y_n]\}$ for n=1 to N. Given a detection window (x,y,w,h) with top-left corner at (x,y) of size (w,h), the calibration pattern can adjust the window to be $$f(x) = a_0 + \sum_{k=1}^{\infty} \left(x - \frac{XnW}{Sn}, y - \frac{Ynh}{Sn}, \frac{W}{Sn}, \frac{h}{Sn}\right).$$

In the present example, N=45. Joint calibration and alignment neural network 442 may, for example, use one pooling layer for more accurate calibration.

Also shown, joint calibration and alignment neural network 442 is configured to generate landmark locations 454, corresponding to initial landmark locations 354 in FIG. 3. Landmark locations 454 can comprise a set of N two-dimensional coordinates, which each identify a point in a corresponding face region that contains a facial landmark. In the present example, N=68.

As indicated above, joint calibration and alignment neural network 442 can improve the quality of adjusted face regions 352 by jointly predicting adjustments 452 and detecting landmark locations 454. For example, the task of detecting landmark locations 454 is highly correlated with the task of determining adjusted face regions 352 and can rely on similar features of input images related to the spatial structure of a face. Thus, for example, accounting for both these tasks, as opposed to just determining adjusted face regions 352, improves the accuracy of adjusted face regions 352. In the example of FIG. 4A, this correlation is captured by generating both adjustments 452 and landmark locations 454 from fully-connected layer 450. This allows for a smaller neural network and accurate adjusted face regions 352.

As indicated above, training manager 220 can train joint calibration and alignment neural network 442 to jointly predict adjustments 452 and landmark locations 454. In doing so, the loss function employed by output analyzer 224 can account for both adjustments 452 and landmark locations 454. For example, updates (e.g., calculated errors from ground truth) from each output can be summed or otherwise combined and used to update joint calibration and alignment neural network 442 during training. Suitable loss functions include IoU loss and Euclidean distance loss. IoU loss may be preferred for higher calibration accuracy.

In embodiments where face detector 340 is implemented using neural networks, joint calibration and alignment neural network 442 can be in cascade with those one or more neural networks. For example, joint calibration and alignment neural network 442 can comprise one neural network and face detector 340 can comprise three neural networks to implement face detection and landmark localization using four cascaded CNNs. In training joint calibration and alignment neural network 442, model manger 220 can first train face detector 340, then train joint calibration and alignment neural network 442 using outputs from the trained face detector 340 while fixing its parameters.

In some embodiments, initial landmark locations 354 do not have sufficient accuracy and/or data points to be used as landmark locations 260. For example, increasing the accuracy and/or data points of initial landmark locations 354 may require larger neural networks, such as a larger joint calibration and alignment neural network 442. To improve the accuracy of initial landmark locations 354, model 336 can employ landmark location refiner 344 to produce refined landmark locations 356 from initial landmark locations 354, where refined landmark locations 356 are used as landmark locations 260.

As shown in FIG. 3, landmark location refiner 344 includes landmark location adjuster 344A and optionally landmark location mapper 344B. Landmark location mapper 344B is configured to map initial landmark locations 354 to inputs of landmark location adjuster 344A. Landmark location mapper 334B can be included in landmark location refiner 344 in embodiments where landmark location adjuster 344A uses a different number of landmark locations as inputs than what is included in initial landmark locations 354 and/or if those inputs represent different facial landmarks. For example, landmark location adjuster 344A may in some embodiments require more landmark locations than are detected by joint calibrator and aligner 342. As a specific example, sixty-six facial landmarks could be employed (although some may not always be used for side profiles and the like where facial landmarks are not visible) while only forty eight are included in initial landmark locations 354. Landmark location mapper 344B can analyze initial landmark locations 354 to determine and/or estimate mapped landmark locations to use as inputs to landmark location adjuster 344A.

Using landmark location mapper 344B allows for landmark location adjuster 344A to be upgraded (e.g., by model manager 254) without requiring retaining of neural networks used to produce initial landmark locations 354. Further, those neural networks may in some embodiments detect fewer facial landmarks than required by landmark location adjuster 344A, resulting in smaller and faster networks.

In various embodiments landmark location mapper 344B and/or landmark location adjuster 344A are implemented without neural networks. Landmark location adjuster 344A may, for example, perform face alignment that may employ a supervised descent method to iteratively adjust the positions of landmark locations of a face region that are provided as inputs.

Figure 4B:
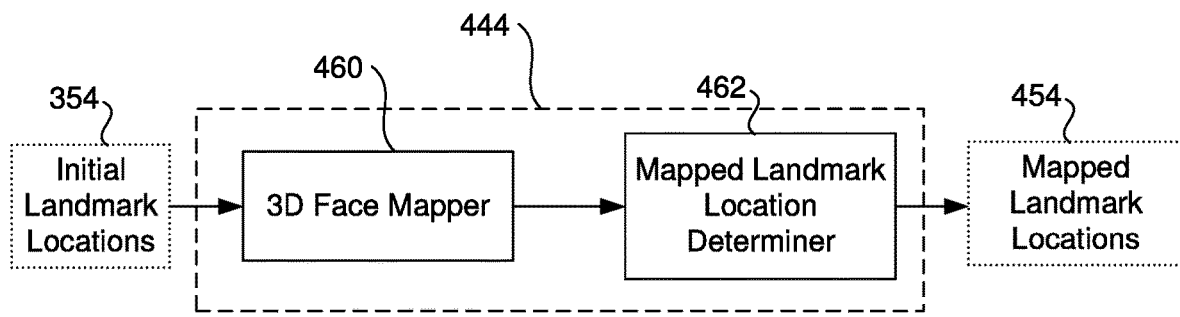
FIG. 4B shows a block diagram that includes a landmark location mapper, in accordance with embodiments of the present disclosure.

As indicated above, in some embodiments landmark location mapper 344B allows the configuration of the output of joint calibrator and aligner 342 to be independent from the input requirements of landmark location adjuster 344A. FIG. 4B shows a block diagram that includes a landmark location mapper, in accordance with embodiments of the present disclosure. Landmark location mapper 444 is an example of landmark location mapper 344B of FIG. 3, although other approaches could be employed.

Landmark location mapper 444 includes 3D face mapper 460 and landmark location determiner 462. 3D face mapper 460 is configured to receive initial landmark locations 354 and map initial landmark locations 354 to a 3D face model. Mapped landmark location determiner 462 determines, from the 3D face model, mapped landmark locations 454. In some embodiments, mapped landmark locations 454 are provided as the inputs to landmark location adjuster 344A. In particular, from the 3D face model, landmark locations that are different than or in additional to initial landmark locations 354 can be determined as used as inputs to landmark location adjuster 344A.

3D face mapper 460 can comprise, for example, a 3D face fitter, which fits initial landmark locations 354 to a predetermined 3D face. Many 3D face mapping algorithms are known and are suitable for 3D face mapper 460. As an example, rigid 3D face fitting can be employed in which the 3D face is not modified based on initial landmark locations 354. Non-rigid 3D face fitting or other approaches may be employed where the 3D face is modified based on initial landmark locations 354. It should be appreciated that rather than 3D face fitting, 3D face mapper 460 could include 3D face generation. 3D face fitting, and in particular rigid 3D face fitting, may be preferred in some embodiments due to lower processing requirements.

In various implementations, 3D face mapper 460 determines a pose of a face in a face region to map its corresponding initial landmark locations 354 to a 3D face. The pose can represent an orientation of the face in the input image with respect to the 2D plane of the image. For example, the pose can capture whether the face is looking up, down, left, or right, and the angle thereof. The 3D model may then be fit to initial landmark positions 354 using the pose.

In some embodiments, mapped landmark location determiner 462 further utilizes the pose of the face in the input image. For example, mapped landmark location determiner 462 can project the 3D face from 3D face mapper 460 into 2D in order to determine mapped landmark locations 454 as 2D coordinates and/or in order to exclude from mapped landmark locations 454 landmark locations that are not visible in the input image. As the 3D face corresponds to initial landmark locations 354, facial landmark locations on the 3D face are likely to be similar to actual landmark locations on the face in the input image. Thus, 3D face mapper 460 can use coordinates of the 3D face as mapped landmark locations 454.

Figure 5:
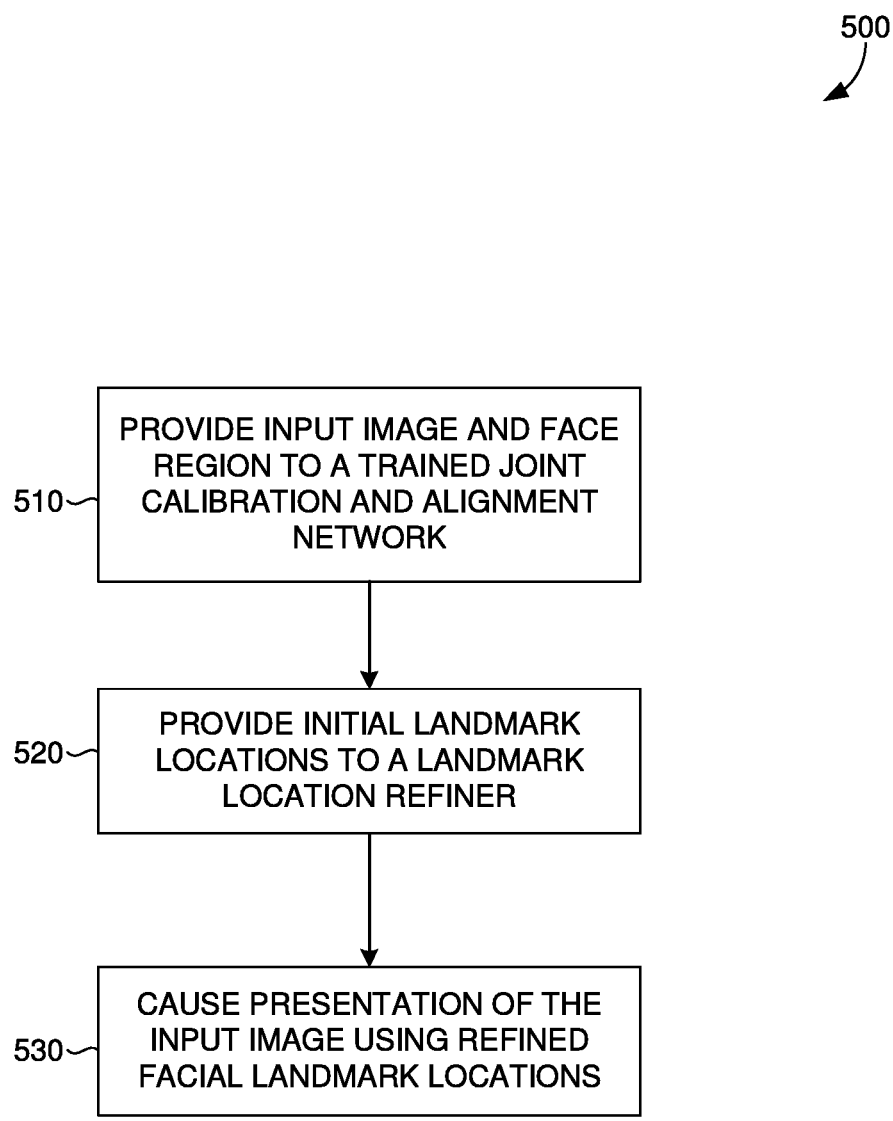
FIG. 5 is a flow diagram showing a method for determining facial landmarks in images, in accordance with embodiments of the present disclosure.

Referring now to FIG. 5, a flow diagram is provided showing an embodiment of a method 500 for determining facial landmarks in images. Each block of method 500 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

At block 510, method 500 includes providing an input image and face region to a trained joint calibration and alignment network. For example, model manager 254 can provide an input image from image data 262 and a face region from initial face regions 350 to joint calibrator and aligner 342, which can generate adjustments to the face region and identify initial landmark locations 354 corresponding to the adjusted face region.

At block 520, method 500 includes providing initial landmark locations to a landmark location refiner. For example, model manager 254 can provide initial landmark locations 354 to landmark location refiner 344 that generates refined landmark locations 356 from initial landmark locations 354.

At block 530, method 500 includes causing presentation of the input image using refined facial landmark locations. For example, presentation component 252 can cause presentation on user device 102A of the input image using refined landmark locations 356. Optionally presentation component 252 can also cause presentation on user device 102A of the input image using adjusted face regions 352.

Figure 6:
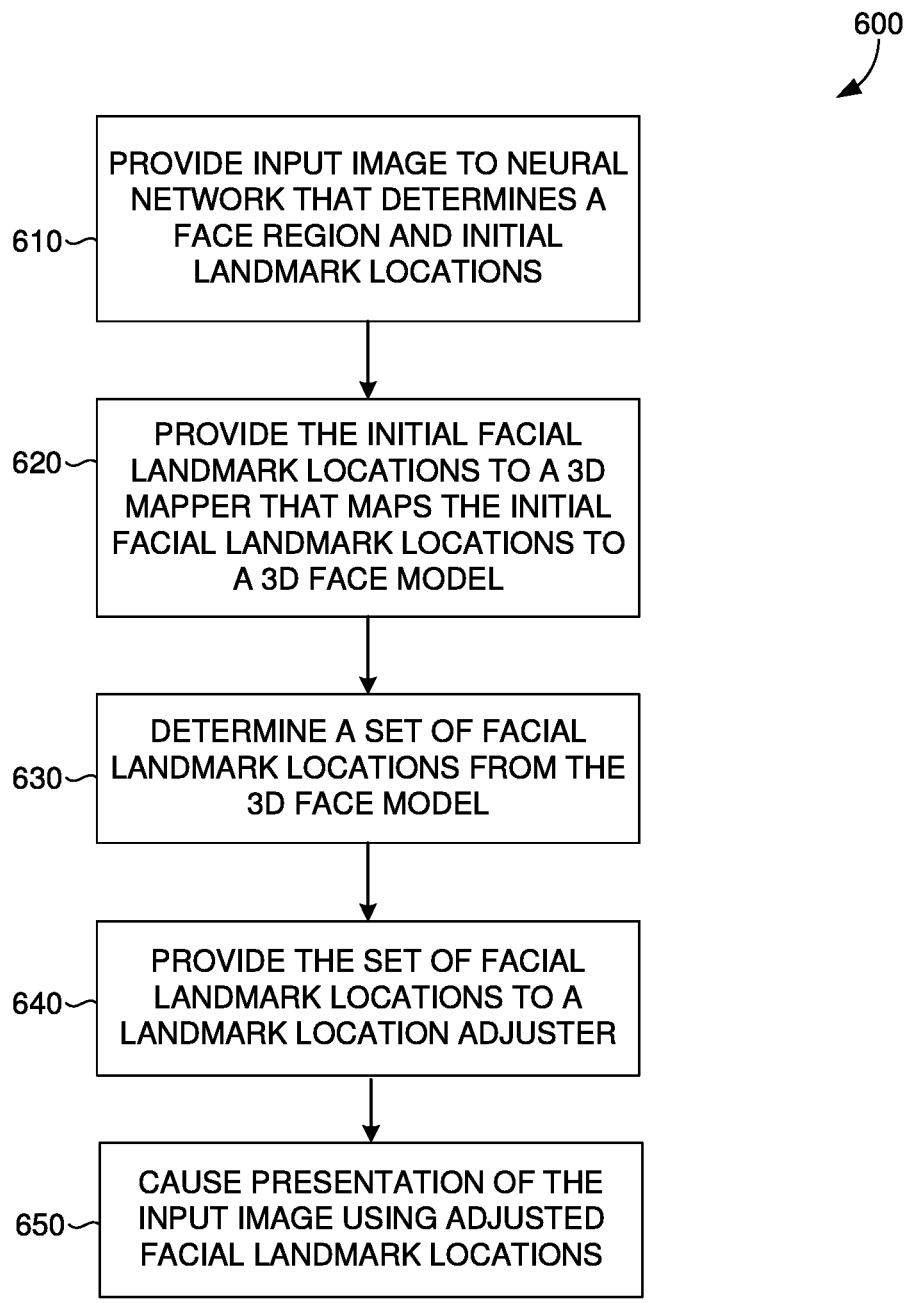
FIG. 6 is a flow diagram showing a method for determining facial landmarks in images, in accordance with embodiments of the present disclosure.

With reference to FIG. 6, a flow diagram is provided showing an embodiment of a method 600 for determining facial landmarks in images.

At block 610, method 600 includes providing an input image to a neural network that determines a face region and initial landmark locations. For example, model manager 254 can provide an input image from image data 262 to at least one trained neural network, such as joint calibration and alignment neural network 442, which determines a face region of adjusted face regions 352 and initial landmark locations 354 corresponding to the face region.

At block 620, method 600 includes providing the initial facial landmark locations to a 3D mapper that maps the initial facial landmark locations to a 3D face model. For example, model manager 254 can provide initial landmark locations 354 to 3D face mapper 460 that maps initial landmark locations 354 to a 3D face model.

At block 620, method 600 includes determining a set of facial landmark locations from the 3D face model. For example, mapped landmark location determiner 462 can determine mapped landmark locations 454 from the 3D face model.

At block 630, method 600 includes providing the set of facial landmark locations to a landmark location adjuster. For example, model manager 254 can provide mapped landmark locations 454 to landmark location adjuster 344A that adjusts positions of mapped landmark locations 454 based on the input image.

At block 640, method 600 includes causing presentation of the input image using refined facial landmark locations. For example, presentation component 252 can cause presentation on user device 102A of the input image using refined landmark locations 356. Optionally presentation component 252 can also cause presentation on user device 102A of the input image using adjusted face regions 352.

Figure 7:
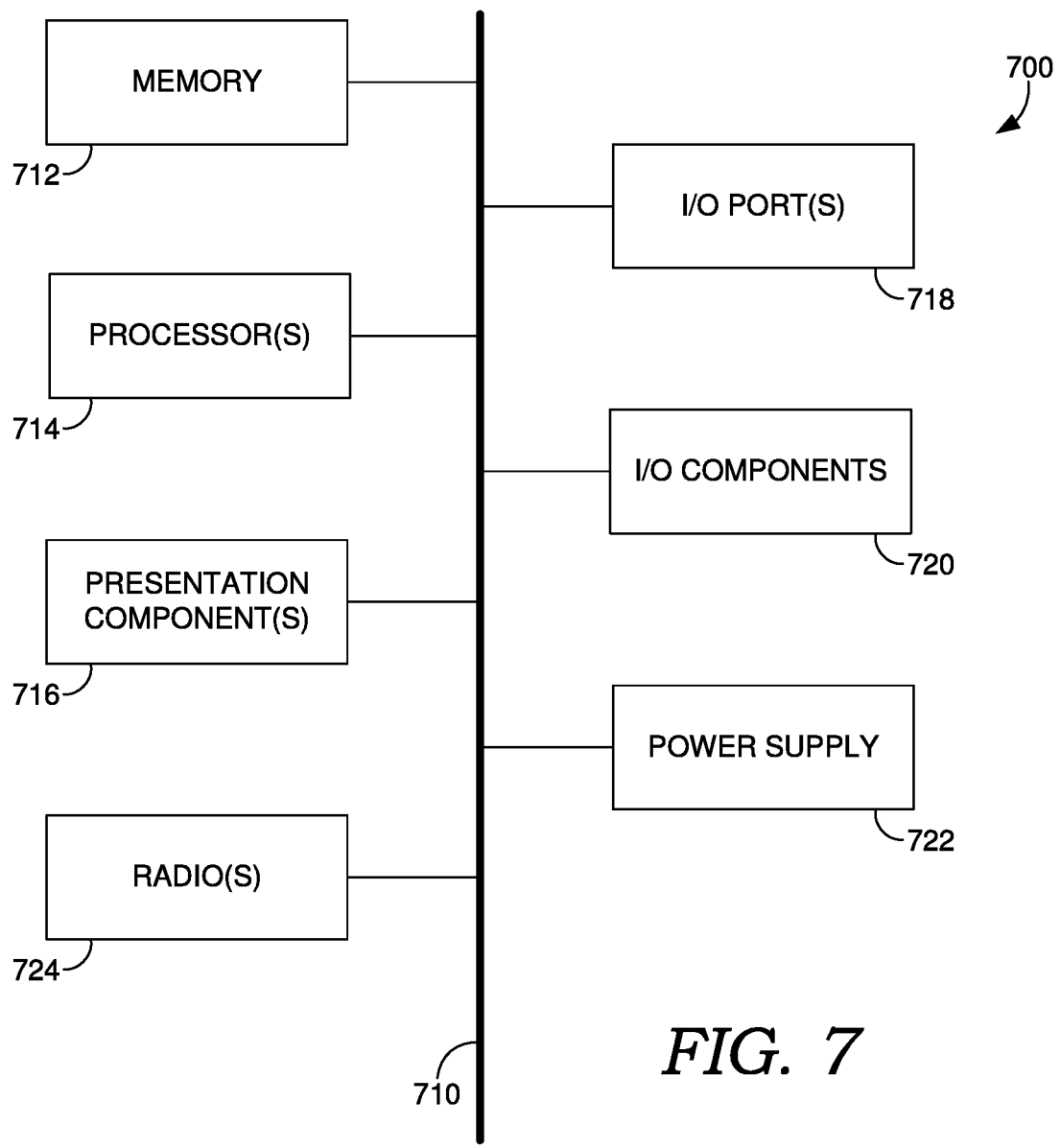
FIG. 7 is a block diagram of an exemplary computing environment suitable for use in implementing embodiments of the present disclosure.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, RGB camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A method comprising:
   jointly predicting, by a neural network, (1) a scale change or offset vector representing an adjustment to an initial bounding box of a face in an input image, the adjustment to the initial bounding box defining an adjusted bounding box of the face and (2) initial facial landmark locations of the face by outputting a representation of both the scale change or offset vector for the initial bounding box and the initial facial landmark locations from a common fully-connected layer of the neural network, each of the initial facial landmark locations corresponding to a two-dimensional point in the input image;
   generating refined facial landmark locations in the input image from the initial facial landmark locations; and
   causing presentation of a representation of the input image using the refined facial landmark locations.

2. The method of claim 1, wherein generating the refined facial landmark locations comprises adjusting a first number of facial landmarks at the initial facial landmark locations to a second number of facial landmarks at the refined facial landmark locations, wherein the first number of facial landmarks is different than the second number of facial landmarks.

3. The method of claim 1, wherein generating the refined facial landmark locations from the initial facial landmark locations comprises:
   mapping the initial facial landmark locations to a 3D face model;
   determining a set of facial landmark locations from the 3D face model; and
   adjusting positions of the set of facial landmark locations in the input image to generate the refined facial landmark locations.

4. The method of claim 1, further comprising classifying, using a face region classifier neural network, a candidate region of the input image as containing the face and providing a representation of a corresponding boundary of the candidate region as the representation of the first boundary, to the neural network, based on the candidate region being classified as containing the face.

5. The method of claim 1, wherein predicting the adjusted bounding box comprises predicting confidence scores for calibration patterns representing components of an adjustment to an initial bounding box of the face.

6. The method of claim 1, wherein causing the presentation of the representation of the input image using the refined facial landmark locations comprises applying image processing to the face represented by the refined facial landmark locations.

7. The method of claim 1, wherein generating the refined facial landmark locations comprises predicting, for each of the refined facial landmark locations, a respective two-dimensional point in the input image.

8. One or more non-transitory computer-readable media having a plurality of executable instructions embodied thereon, which, when executed by one or more processors, cause the one or more processors to perform a method comprising:
   jointly predicting, by a neural network, an adjusted bounding box of a face in an input image and initial facial landmark locations by outputting a representation of both the adjusted bounding box and the initial facial landmark locations from a common fully-connected layer of the neural network, each of the initial facial landmark locations corresponding to a two-dimensional point in the input image;
   mapping initial facial landmark locations to a 3D face model;
   determining a second set of predicted facial landmark locations in the input image from the 3D face model;
   identifying refined facial landmark locations in the input image by adjusting positions of the second set of predicted facial landmark locations; and causing presentation of a representation of the input image using the refined facial landmark locations.

9. The one or more non-transitory computer-readable media of claim 8, wherein the at least one neural network comprises:
a face detector configured to classify a candidate region of the input image as containing the face; and
a subsequent joint calibration and alignment neural network configured to jointly predict, based on the candidate region being classified as containing the face, the adjusted bounding box of the face and the initial facial landmark locations of the face.

10. The one or more non-transitory computer-readable media of claim 8, wherein determining the second set of predicted facial landmark locations comprises:
projecting the 3D face model into two-dimensions based on a pose of a face in the input image; and
determining the second set of predicted facial landmark locations from the projected 3D face model.

11. The one or more non-transitory computer-readable media of claim 8, wherein determining the second set of predicted facial landmark locations comprises identifying a different number of facial landmarks locations than the initial facial landmark locations.

12. The one or more non-transitory computer-readable media of claim 8, wherein the neural network is configured to predict the adjusted bounding box as a scale change or offset vector applied to an initial bounding box of the face.

13. The one or more non-transitory computer-readable media of claim 8, wherein causing the presentation of the representation of the input image comprises applying image processing to the face represented by the refined facial landmark locations.

14. A system comprising:
a model manager configured to use one or more hardware processors to:
use a joint calibration and alignment neural network to jointly predict (1) an adjusted bounding box of a face in an input image represented by a predicted scale change or offset vector for an initial bounding box of the face and (2) initial facial landmark locations of the face, each of the initial facial landmark locations corresponding to a two-dimensional point in the input image; and
provide the initial facial landmark locations to a landmark location refiner configured to generate refined facial landmark locations in the input image from the initial facial landmark locations; and
a presentation component configured to use the one or more hardware processors to cause presentation of a representation of the input image using the refined facial landmark locations.

15. The system of claim 14, further comprising an image processor configured to use the one or more hardware processors to process the input image using the refined facial landmark locations to generate a processed input image, wherein the presentation component is configured to cause the presentation of the processed input image.

16. The system of claim 14, wherein the joint calibration and alignment neural network includes a common fully connected layer configured to generate a representation of both the adjusted bounding box and the initial facial landmark locations.

17. The system of claim 14, wherein the landmark location refiner comprises a landmark location adjuster configured to use the one or more hardware processors to adjust positions of a set of facial landmark locations corresponding to the initial facial landmark locations to generate the refined facial landmark locations.

18. The system of claim 14, wherein the landmark location refiner is further configured to use the one or more hardware processors to:
map the initial facial landmark locations to a 3D face model;
determine a set of facial landmark locations from the 3D face model; and
adjust positions of the set of facial landmark locations in the input image to generate the refined facial landmark locations.

* * * * *